US010640205B2

(12) United States Patent
Paulson et al.

(10) Patent No.: US 10,640,205 B2
(45) Date of Patent: May 5, 2020

(54) OUTBOARD CENTRIFUGAL FORCE BEARING WITH INBOARD BLADE FOLD AXIS IN A FOLDING ROTOR BLADE ASSEMBLY

(71) Applicant: Bell Helicopter Textron Inc., Fort Worth, TX (US)

(72) Inventors: Jared Mark Paulson, Fort Worth, TX (US); Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 255 days.

(21) Appl. No.: 15/846,011

(22) Filed: Dec. 18, 2017

(65) Prior Publication Data

US 2019/0185153 A1 Jun. 20, 2019

(51) Int. Cl.
*B64C 27/50* (2006.01)
*B64C 27/48* (2006.01)
*B64C 3/56* (2006.01)
*B64C 29/00* (2006.01)

(52) U.S. Cl.
CPC ............. *B64C 27/50* (2013.01); *B64C 27/48* (2013.01); *B64C 3/56* (2013.01); *B64C 29/0033* (2013.01)

(58) Field of Classification Search
CPC .......... B64C 27/50; B64C 27/48; B64C 3/56; B64C 29/0033; B64C 11/28; B64C 27/35
See application file for complete search history.

(56) References Cited

U.S. PATENT DOCUMENTS

| | | |
|---|---|---|
| 2,623,713 A | 12/1952 | Foster |
| 2,658,576 A * | 11/1953 | Mosinskis Vytautas ..................... B64C 27/50 416/106 |
| 3,026,942 A | 3/1962 | Cresap |
| 3,153,455 A | 10/1964 | Mosinskis |
| 3,625,631 A | 12/1971 | Covington, Jr. et al. |
| 3,652,185 A | 3/1972 | Cresap et al. |
| 3,967,918 A | 7/1976 | Mouille et al. |
| 4,252,504 A | 2/1981 | Covington et al. |
| 4,257,739 A | 3/1981 | Covington et al. |
| 4,268,222 A | 5/1981 | Bernard |
| 4,427,340 A | 1/1984 | Metzger et al. |
| 4,522,563 A | 6/1985 | Reyes et al. |
| 4,691,878 A | 9/1987 | Vaughan et al. |
| 5,031,858 A | 7/1991 | Schellhase et al. |
| 5,059,094 A | 10/1991 | Robinson et al. |
| 5,096,380 A | 3/1992 | Byrnes et al. |
| 5,337,974 A | 8/1994 | Rumberger et al. |

(Continued)

OTHER PUBLICATIONS

Paulson, Jared Mark, "U.S. Appl. No. 15/845,720", filed Dec. 18, 2017.

(Continued)

*Primary Examiner* — Aaron R Eastman
(74) *Attorney, Agent, or Firm* — Winstead PC

(57) ABSTRACT

A rotor blade assembly for a tiltrotor aircraft comprising a rotor blade pivotally connected to a yoke with dual concentric blade bolts having a common central axis providing a pivotal axis inboard of an outboard CF bearing and the yoke tip. In use, the compact folded arrangement of the rotor blades reduces folded aircraft dimensions in response to ever increasing restricted storage space parameters.

20 Claims, 7 Drawing Sheets

(56) References Cited

U.S. PATENT DOCUMENTS

| | | | |
|---|---|---|---|
| 5,358,381 A | 10/1994 | Covington et al. | |
| 5,645,400 A | 7/1997 | Hunter et al. | |
| 5,868,351 A | 2/1999 | Stamps et al. | |
| 6,036,442 A | 3/2000 | Certain et al. | |
| 7,530,790 B2 * | 5/2009 | Cabrera | B64C 27/10 416/134 A |
| 8,231,346 B2 | 7/2012 | Stamps et al. | |
| 8,360,727 B2 | 1/2013 | Stamps et al. | |
| 9,156,545 B1 | 10/2015 | Fenny et al. | |
| 9,169,010 B2 | 10/2015 | Foskey et al. | |
| 9,499,262 B2 | 11/2016 | Foskey et al. | |
| 2004/0026564 A1 | 2/2004 | Romani et al. | |
| 2013/0149151 A1 | 6/2013 | Rauber et al. | |
| 2014/0271199 A1 | 9/2014 | Maresh et al. | |
| 2014/0271222 A1 | 9/2014 | Maresh et al. | |
| 2015/0125300 A1 | 5/2015 | Stamps et al. | |
| 2016/0152329 A1 | 6/2016 | Tzeng et al. | |
| 2017/0144746 A1 | 5/2017 | Schank et al. | |
| 2017/0320567 A1 * | 11/2017 | Miller | B64O 27/72 |
| 2018/0229830 A1 | 8/2018 | Foskey et al. | |
| 2018/0244377 A1 | 8/2018 | Chan | |

OTHER PUBLICATIONS

Paulson, Jared Mark, "U.S. Appl. No. 15/845,810", filed Dec. 18, 2017.

Paulson, Jared Mark, "U.S. Appl. No. 15/845,876", filed Dec. 18, 2017.

Paulson, Jared Mark, "U.S. Appl. No. 15/845,928", filed Dec. 18, 2017.

Paulson, Jared Mark, "U.S. Appl. No. 15/845,967", filed Dec. 18, 2017.

Cravener, Kyle Thomas, "U.S. Appl. No. 15/963,516", filed Apr. 26, 2018.

Paulson, Jared Mark, "U.S. Appl. No. 16/016,280", filed Jun. 22, 2018.

* cited by examiner

OUTBOARD CENTRIFUGAL FORCE BEARING WITH INBOARD BLADE FOLD AXIS IN A FOLDING ROTOR BLADE ASSEMBLY

CROSS-REFERENCE To RELATED APPLICATIONS

This patent application is related to U.S. patent application Ser. No. 15/845,720; entitled "Split Yoke In A Folding Rotor Blade Assembly," U.S. patent application Ser. No. 15/845,810; entitled "Compact Folding Yoke In A Folding Rotor Blade Assembly," U.S. patent application Ser. No. 15/845,876; entitled "Compact Folding Yoke With Flexible Yoke Arms In A Folding Rotor Blade Assembly," U.S. patent application Ser. No. 15/845,928; entitled "Dual Blade Fold Bolts And Inboard Centrifugal Bearing In A Folding Rotor Blade Assembly," and U.S. patent application Ser. No. 15/845,967; entitled "Folding Spindle And Bearing Assembly In A Folding Rotor Blade Assembly". Each patent application identified above is filed on the same date as this patent application and is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that the maximum number of aircraft can be accommodated within the limited storage space, the blade assemblies of some rotor systems can be folded so that each rotor blade is generally parallel with each other in order to reduce the overall profile of the blade assembly. Typically, each rotor blade is folded about a single pivot point positioned outboard of the yoke that attaches the rotor blade to the central drive mast. The single pivot point is also necessarily outboard of a set of inboard and outboard bearings that connect the rotor blade to the yoke. The distance between the inboard and outboard bearings is dependent on aircraft configuration where each configuration has an optimal distance for that particular aircraft's loads and dynamics. As a result, in order to not interfere with the bearings and preserve the optimal distance between the bearings, the pivot point of each rotor blade is typically at least that optimal distance out from the inboard connection of the rotor blade to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

An example folding rotor blade assembly for a tiltrotor aircraft includes a drive mast connected to a hub spring assembly, a yoke connected to the hub spring assembly, an inboard bearing assembly connected to the yoke proximate the hub spring assembly, an outboard bearing assembly, including an outboard centrifugal force ("CF") bearing, connected to the yoke, a grip connected to the inboard bearing assembly, and a rotor blade connected to the grip at a pivotal connection positioned inboard of the CF bearing.

An example folding rotor blade assembly includes a yoke connected to a hub spring assembly, an inboard clamp mounted to the yoke proximate the hub spring assembly and connected to an inboard shear bearing, an inboard beam, housing the inboard shear bearing, connected to a grip, a spindle connected to the yoke and connected to an outboard centrifugal force ("CF") bearing, an outboard beam, housing the outboard CF bearing, connected to a rotor blade, and the rotor blade connected to the grip at a pivotal connection positioned inboard of the outboard CF bearing.

An example method includes pitching a rotor blade of a rotor blade assembly comprising an inboard bearing connected to a yoke and a grip, an outboard bearing connected to the yoke and the rotor blade, the rotor blade connected to the grip at a lockable connection with releasable pins and at a pivotable connection with axially aligned blade bolts providing a pivot axis inboard of the outboard bearing, releasing the releasable pins at the lockable connection, and rotating the rotor blade about the pivot axis.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
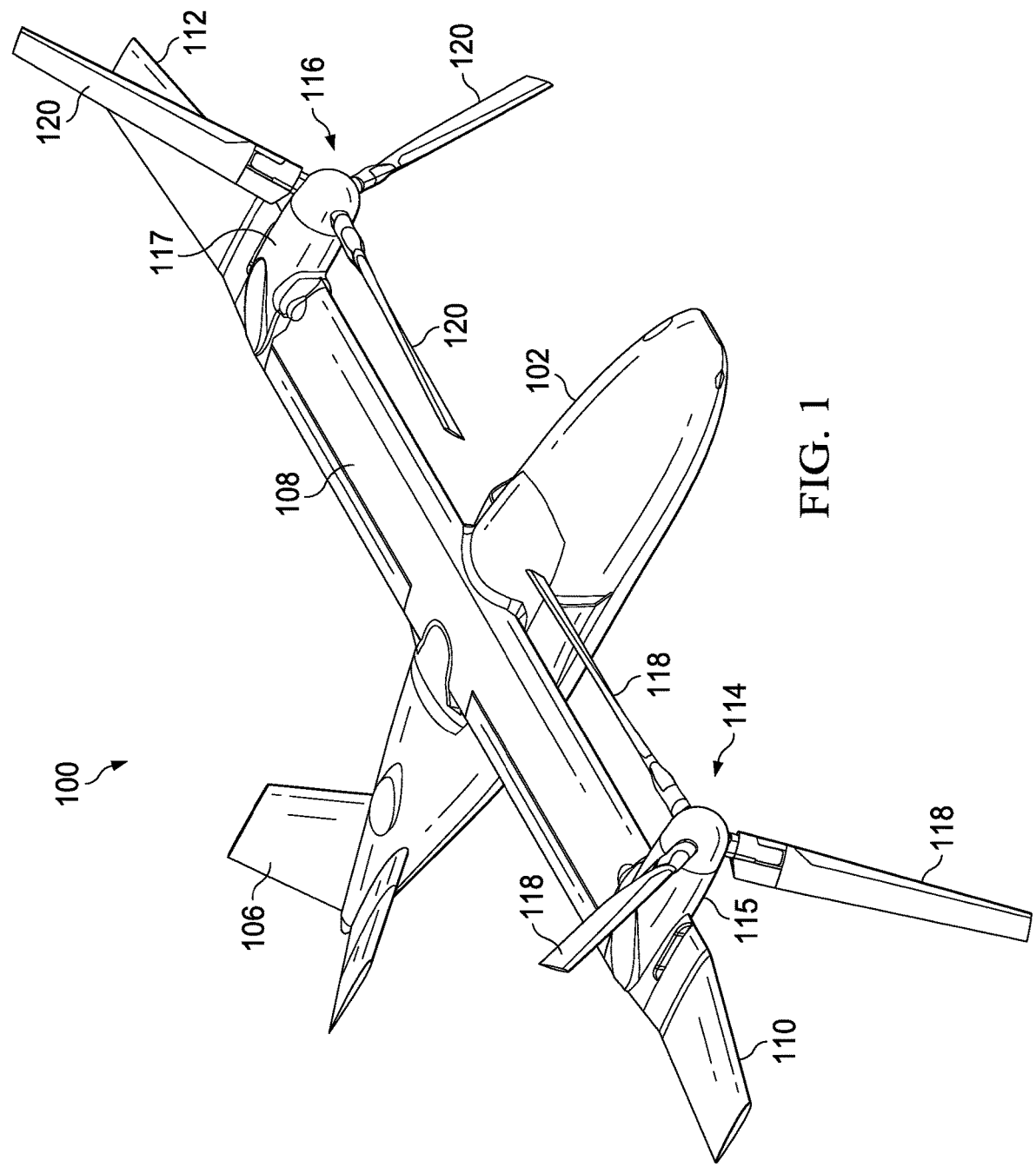
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
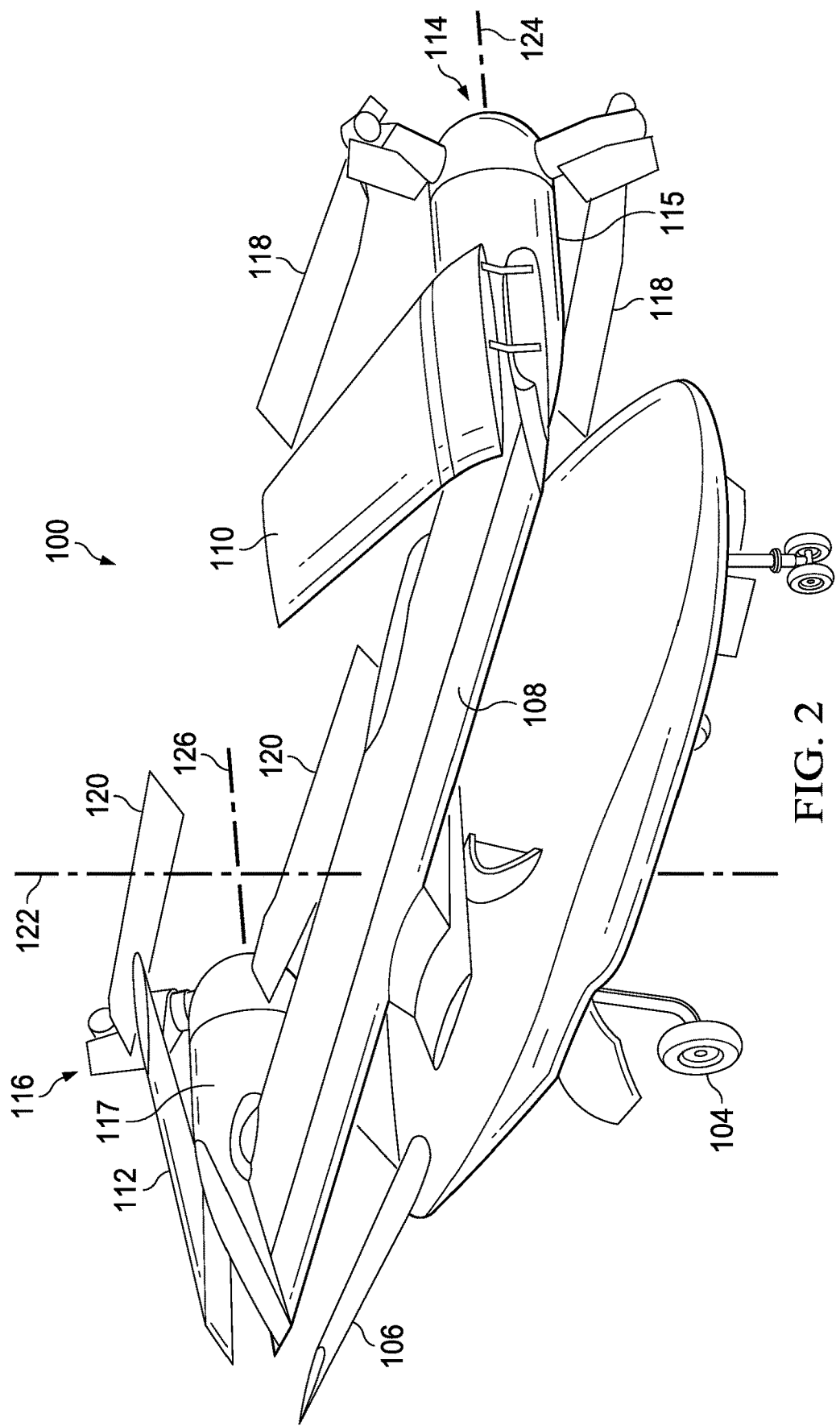
FIG. 2 is a perspective view of a tiltrotor aircraft in a stowed position according to aspects of the disclosure.

Referring to FIGS. 1 and 2, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is housed within nacelle 115 located on an end portion of wing 108 proximate wing tip 110, while rotor system 116 is housed within nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1 represents tiltrotor aircraft 100 in operational flying position in an airplane mode. FIG. 2 represents tiltrotor aircraft 100 in a stowed position where rotor blades 118 have been folded generally parallel with each other and rotor blades 120 have been folded generally parallel with each other in order to reduce the dimensions of the aircraft to whatever degree is required in response storage space restrictions. In the stowed position, wing 108 is swivelled approximately 90° to generally align with fuselage 102.

Generally each rotor system includes a mast driven by a power source. A rotor system includes a yoke connected to the mast and rotor blades indirectly connected to the yoke with bearings. The bearings are generally elastomeric bearings constructed from a rubber type material that absorb vibration. There may be inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other bearings. The bearings accommodate forces acting on the rotor blades allowing each rotor blade to flex with respect to the yoke/mast and other rotor blades.

The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
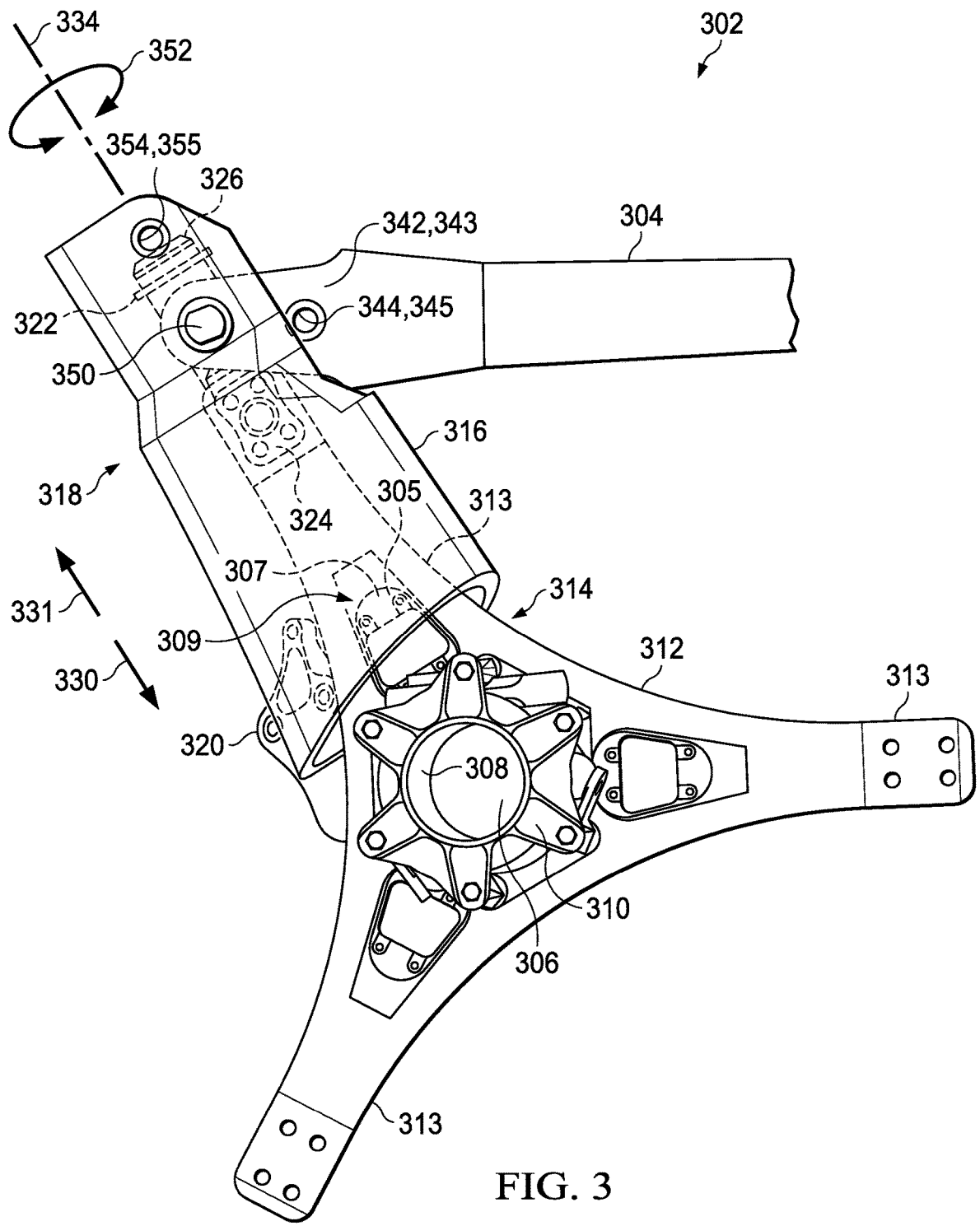
FIG. 3 is a partial top view of a blade assembly in a folded position according to one or more aspects of the disclosure.
Figure 4:
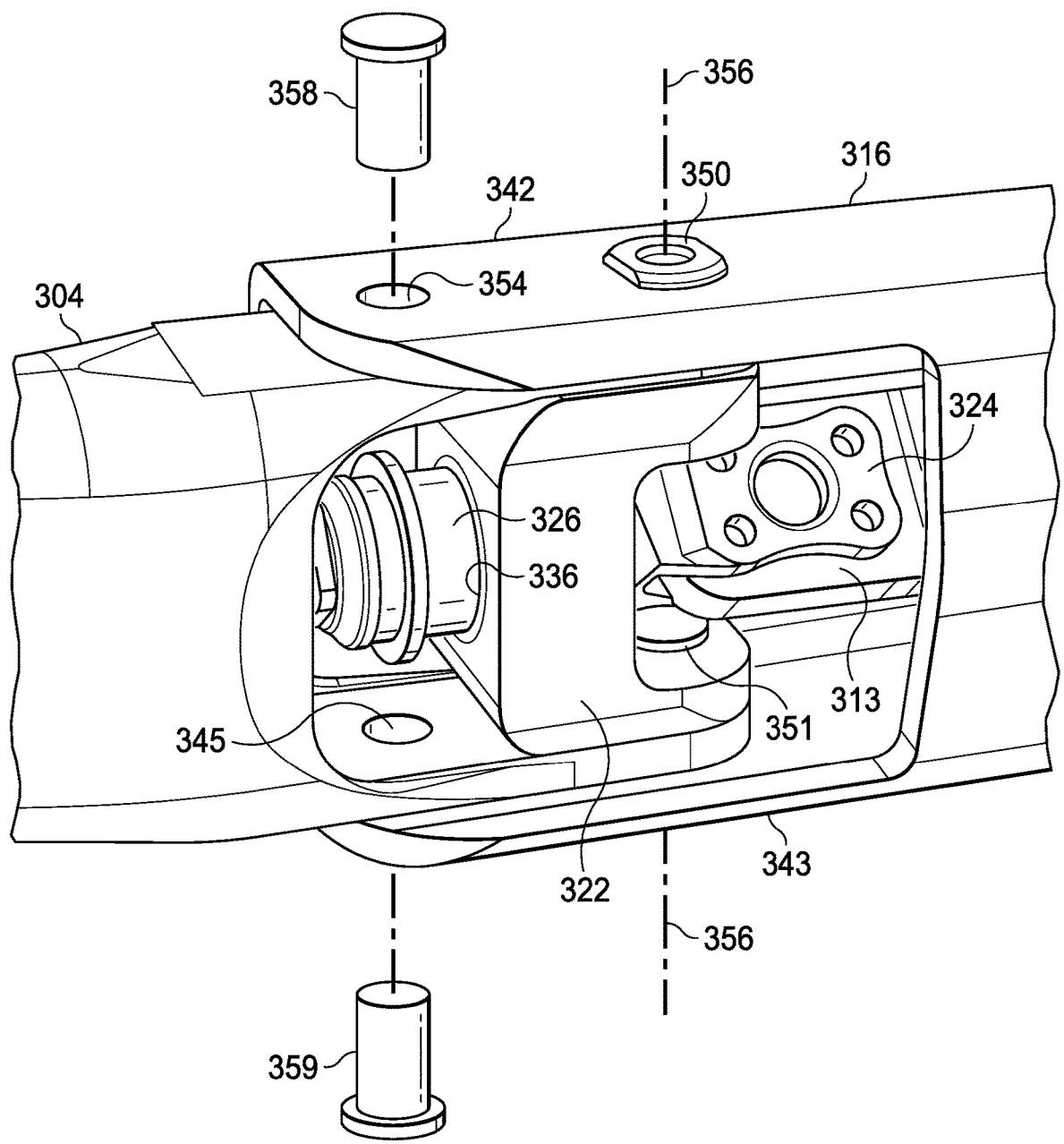
FIG. 4 is a partial perspective view of a rotor blade connection in an unfolded position according to one or more aspects of the disclosure.

Referring to FIGS. 3 and 4, blade assembly 302 is shown in a folded position. Each rotor system 114 and 116 comprises a separate blade assembly. In the interest of clarity, a single blade assembly is described herein with the understanding that tiltrotor aircraft 100 comprises a pair of similarly configured blade assemblies. In an unfolded position, each rotor blade of blade assembly 302 is generally equally spaced from each other around a mast. For example, in the three rotor blade configuration shown, 120° separates each rotor blade. It should also be appreciated that teachings regarding blade assembly 302 can apply to blade assemblies having greater or fewer rotor blades.

Mast 306 is connected to hub spring assembly 310 through central opening 308. Yoke 312 is mounted to hub spring assembly 310 through a central aperture axially aligned with central opening 308. Yoke 312 includes yoke arms 313 extending radially from the central aperture. A rotor blade, for example rotor blade 304, is connected to yoke 212 at each yoke arm 313. In the interest of clarity, a single connection between a yoke arm and a rotor blade is described herein with the understanding that blade assembly 302 comprises a similarly configured connection for each extension, rotor blade interface.

Inboard direction 330 points toward mast 306 of a blade assembly while outboard direction 331 points away from the mast along longitudinal axis 334 of each rotor blade/yoke arm. Inboard bearing assembly 314 connects yoke 312 to grip 316 via an inboard shear bearing. Inboard bearing assembly 314 includes inboard beam 305, clamp plate 307, and inboard shear bearing 309. Clamp plate 307 is mounted to yoke 312 proximate hub spring assembly 310. Clamp plate 307 is connected to inboard shear bearing 309. Inboard beam 305 is connected to grip 316. Inboard beam 305 houses inboard shear bearing 309.

A swash plate is connected to mast 306. Pitch links extend from the swash plate. The pitch links are connected to pitch horns 320. Pitch horn 320 is connected to grip 316. The swash plate, pitch links, and pitch horns are operatively connected to an actuator to pitch each rotor blade and grip relative to yoke 212 in direction 352 around longitudinal axis 334 of each rotor blade. Longitudinal axis 334 may also be referred to as a blade pitch change axis. Each rotor blade is free to rotate or "pitch" about its central longitudinal axis with respect to the yoke in a range between 0° to 90°.

Outboard bearing assembly 318 connects yoke arm 313 to grip 316 and rotor blade 304 via an outboard centrifugal force ("CF")/shear bearing. Outboard bearing assembly 318 includes outboard beam 322, spindle 324, and outboard CF/shear bearing 326. Outboard beam 322 is connected to grip 316. Outboard beam 322 includes passage 336. Spindle 324 is mounted to yoke arm 313 outboard of inboard bearing assembly 314. Outboard CF/shear bearing 326 extends from spindle 324 through passage 336. Rotor blade 304 is sandwiched between outboard beam 322 and grip 316.

Blade tangs 342, 343 extend from rotor blade 304. Blade tangs 342, 343 include locking holes 344, 345, respectively. Locking holes 344, 345 are axially aligned. Blade tangs 342, 343 are pivotally connected to outboard beam 322 and grip 316. Grip 316 includes locking holes 354, 355. Locking holes 354, 355 are axially aligned. In an unfolded position (FIG. 4), locking holes 344, 345, 354, and 355 are axially aligned. Releasable pins 358, 359 are sized to engage locking holes 344, 345, 354, and 355 lock rotor blade 304 with respect to grip 316 in an unfolded position. The blade tangs are connected to the outboard beam and the grip with dual, axially aligned blade fold bolts 350, 351. Blade fold bolts 350, 351 provide pivot axis 356. Rotor blade 304 is rotatable around pivot axis 356 relative to outboard beam 322 and grip 316.

Figure 5:
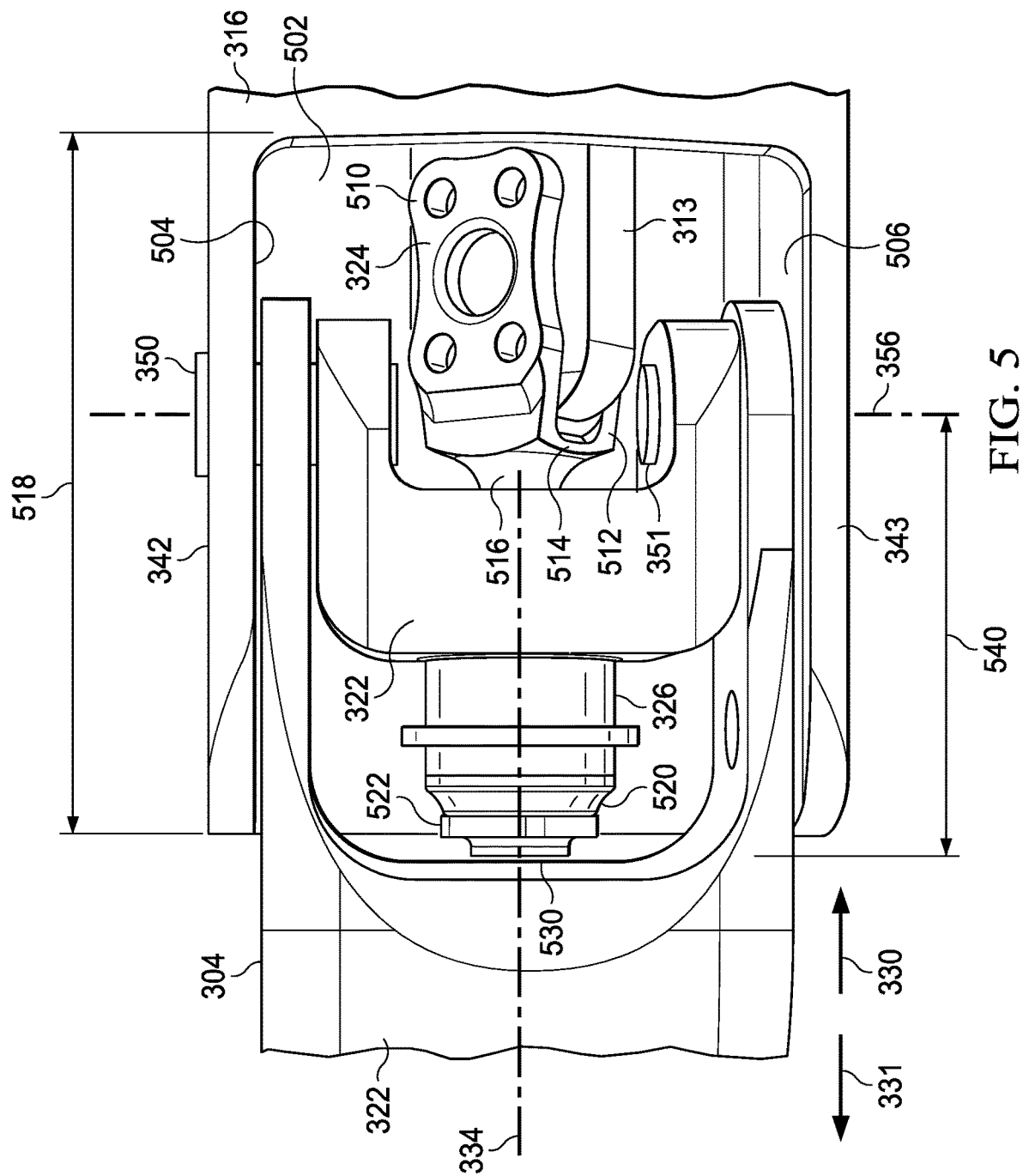
FIG. 5 is a partial side view of a rotor blade connection in an unfolded position according to one or more aspects of the disclosure.

Referring to FIG. 5, an illustrative pivotal connection of a rotor arm to the yoke is shown. Outboard beam 322 is connected to rotor blade 304 between blade tangs 342, 343. Grip 316 defines cutout 502. Cutout 502 is positioned between surfaces 504, 506 and includes span 518. Span 518 is at least ¼ of the overall length of grip 316 to allow the rotor blade to fold against the grip. Surfaces 504, 506 are interior surfaces of grip 316. Blade fold bolts 350, 351 pivotally connect blade tangs 342, 343 to grip 316 at surfaces 504, 506. Blade tangs 342, 343 are interior to grip 316 adjacent surfaces 504, 506. It should also be appreciated that the blade tangs could alternatively be connected exterior surfaces of grip 316.

Spindle 324 is a clevis including aligned prongs 510, 512 extending generally parallel from bridge 514. The space between prongs 510, 512 is sized to engage yoke arm 313. Shaft 516 extends from bridge 514 through passage 336 and engages outboard CF/shear bearing 326. Ring 520 is connected to shaft 516 and abuts outboard CF/shear bearing 326. Cap plate 522 is connected to ring 520 to prevent rotation of outboard CF/shear bearing 326 around shaft 516. Cap plate 522, ring 520, outboard CF/shear bearing 326, and spindle 324 attached to yoke arm 313 effectively create tip 530 of yoke arm 313. Pivot axis 356 is positioned distance 540 inboard of outboard tip 530. Distance 540 is measured parallel with longitudinal axis 334. Pivot axis 356 is positioned inboard of CF/shear bearing 326. The CF load path of rotor blade 304 is from blade tangs 342, 343 to outboard beam assembly 318 to spindle 324 to yoke 312. Pivot axis 356 is on the centrifugal force ("CF") path of rotor blade 304.

Figure 6:
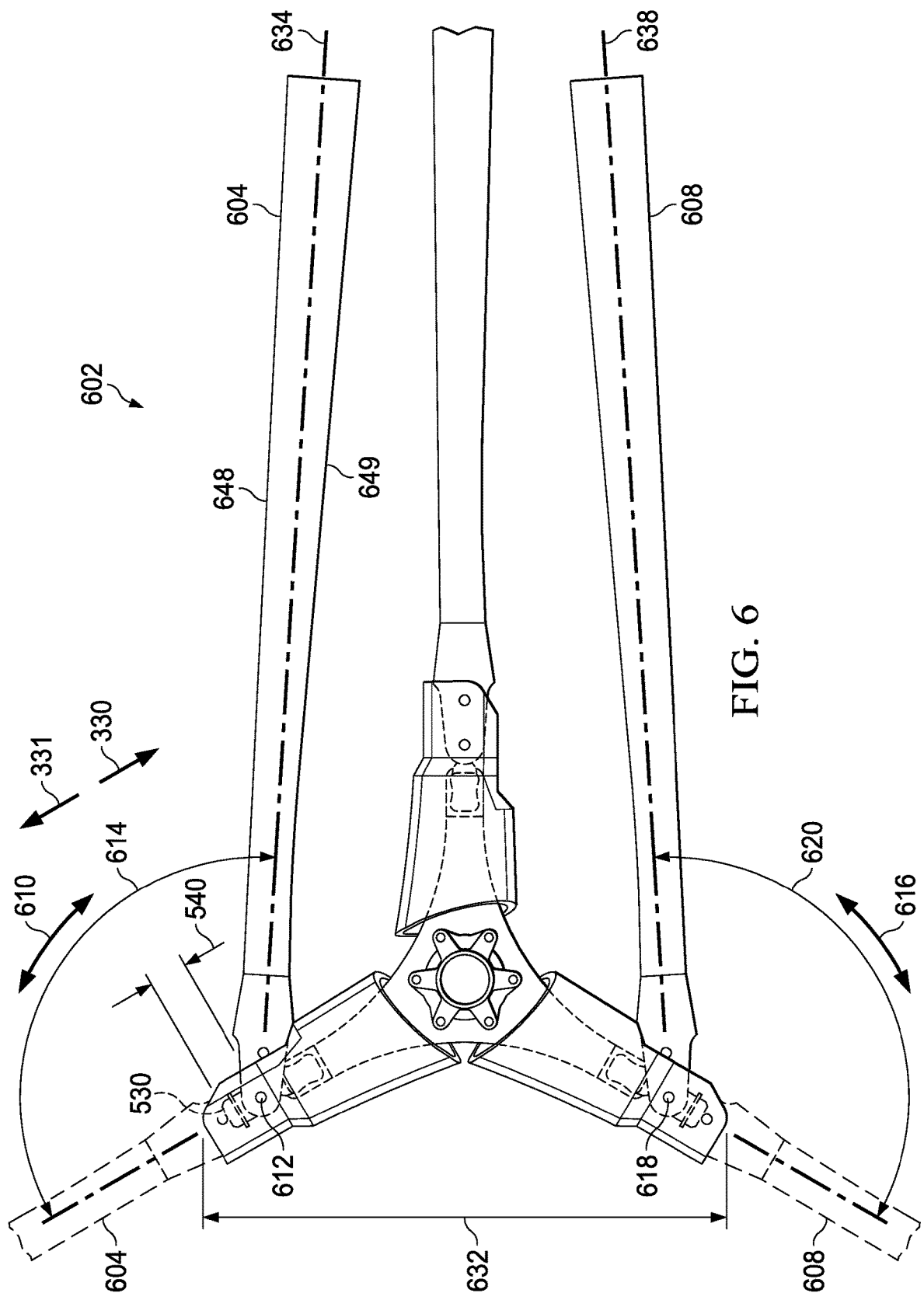
FIG. 6 is a top view of a rotor blade assembly in a folded position according to aspects of the disclosure.

Referring to FIG. 6, blade assembly 602 is shown in a folded position. Unfolded rotor blade 604 and unfolded rotor blade 608 are depicted in shadow. Rotor blade 604 includes central longitudinal axis 634. Rotor blade 608 includes central longitudinal axis 638. Rotor blade 604 is rotated in direction 610 at pivot point 612 around pivot axis 356 through angle 614. Rotor blade 608 is rotated in direction 616 at pivot point 618 around pivot axis 356 through angle 620. Axially aligned blade bolts 350, 350 at pivot points 612 and 618 provide pivot axis 356 for each rotor blade with respect to its grip.

Pivot points 612 and 618 are located distance 540 in the inboard direction 330 from tip 530. Pivot points 612 and 618 are positioned inboard of outboard CF/shear bearing 326. Distance 540 is measured along the longitudinal axis 634 and 638 of rotor blades 604 and 608, respectively. Pivot points 612 and 618 are positioned on longitudinal axes 634 and 638, respectively. The pivot point of each rotor blade positioned inboard of the outboard CF/shear bearing allows folded profile 632 to be less than if the pivot point were outboard of the yoke tip. Each rotor blade includes leading edge 648 and trailing edge 649.

Actuators are operatively connected to the rotor blades to facilitate rotational movement of the rotor blades about the pivot points. Angles 614 and 620 may be in the range of 90° to 180°. Physical stops or proximity sensors signal the actuators to cease rotational movement of the rotor blades.

Rotor blade 604 cannot rotate at pivot point 612 and rotor blade 608 cannot rotate at pivot point 618 until releasable pins 358, 359 are temporarily removed from engagement with locking holes 344, 345, 354, and 355. Actuators are connected to releasable pins 358, 359 to temporarily release the pins from engagement with the blade tangs and the grip. Releasable pins 358, 359 lock each blade tang, thus the rotor arm, with respect to the grip in the unfolded position and when removed, allows each rotor blade to rotate relative to grip 316 and outboard bearing assembly 318.

Figure 7:
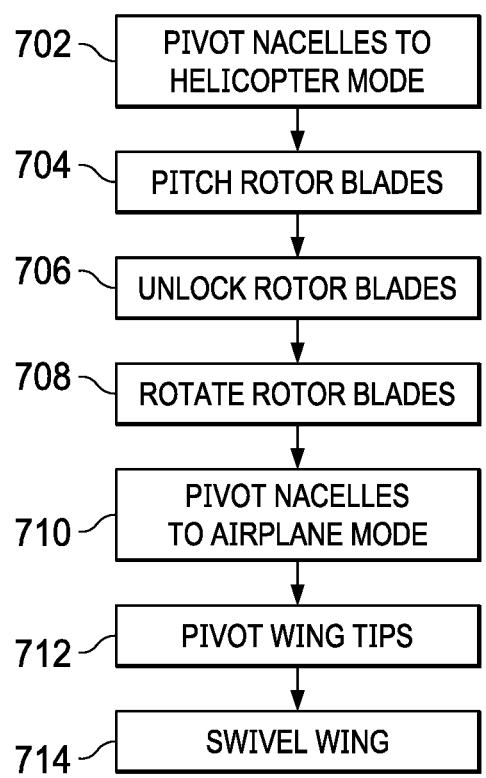
FIG. 7 is a flowchart of the actions performed in converting a tiltrotor aircraft from a flight ready position to a stowed position according to aspects of the disclosure.

Referring to FIG. 7, the actions performed in converting tiltrotor aircraft 100 from a flight ready position to a stowed position are shown. At block 702, nacelles 115 and 117 which house rotor systems 114 and 116, respectively, are pivoted to helicopter mode. Each nacelle is rotated nose up to approximately 90° nacelle angle. A 90° nacelle angle is where the longitudinal axis of the nacelle is generally vertical relative to the ground. The blade assemblies of each rotor system are generally horizontal. At block 704, each rotor blade is pitched about its central longitudinal axis to high collective position. High collective is when the leading edge of each rotor blade is generally facing upward. This is referred to as indexing the rotor blades. Actuators operatively connected to pitch horns 320 facilitate the change in pitch of the rotor blades.

At block 706, each to-be-folded rotor blade is unlocked from grip 316. Actuators operatively connected to releasable pins 358, 359 facilitate temporary removal or "pulling" of releasable pins 358, 359 from engagement with the blade tangs and grip of each to-be-folded rotor blade. The position and quantity of identified to-be-folded rotor blades can vary depending on rotor blade assembly configuration (e.g., two of the three blades in the illustrated embodiment are folded). At block 708, each to-be-folded rotor blade is rotated about pivot axis 356 provided by the axially aligned blade fold bolts 350, 351. Each rotor blade is rotated relative to outboard bearing assembly 318 and grip 316. Actuators operatively connected to the rotor blades facilitate the rotational movement of the rotor blades. The rotor blades are rotated toward the fuselage until the rotor blades are generally parallel with each other at which point physical stops or proximity sensors signal the actuators to cease movement of the rotor blades. At block 710, nacelles 115 and 117 are pivoted to airplane mode. Each nacelle is rotated to approximately 0° nacelle angle. A 0° nacelle angle is where the longitudinal axis of the nacelle is generally horizontal relative to the ground. The blade assemblies of each rotor system remain generally horizontal. At block 712, wing tips 110 and 112 are pivoted toward the fuselage. At block 714, wing 108 is swivelled about vertical axis 122 to lie above and generally align with the fuselage. The entire sequence of converting tiltrotor aircraft 100 from an operational flight ready position to a stowed position can be completed in a range of 1 to 2 minutes in a wind of up to at least 60 knots. It can be interrupted or stopped at any point to facilitate maintenance. Manual operation is possible in the event of a system failure. It is to be understood that several of the previous actions may occur simultaneously or in different order. The order of actions disclosed is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A folding rotor blade assembly for a tiltrotor aircraft, comprising:
    a drive mast connected to a hub spring assembly;
    a yoke connected to the hub spring assembly;
    an inboard bearing assembly connected to the yoke proximate the hub spring assembly;
    an outboard bearing assembly, including an outboard centrifugal force ("CF") bearing, connected to the yoke;
    a grip connected to the inboard bearing assembly; and
    a rotor blade connected to the grip at a pivotal connection positioned inboard of the outboard CF bearing.

2. The folding rotor blade assembly of claim 1, wherein the outboard bearing assembly further comprises an outboard shear bearing.

3. The folding rotor blade assembly of claim 1, wherein the inboard bearing assembly further comprises an inboard shear bearing.

4. The folding rotor blade assembly of claim 1, wherein the outboard bearing assembly further comprises:
    an outboard beam connected to the rotor blade and connected to the outboard CF bearing; and
    a spindle connected to the outboard CF bearing and connected to the yoke opposite the hub spring assembly.

5. The folding rotor blade assembly of claim 1, wherein the inboard bearing assembly further comprises:
    a clamp plate connected to the yoke and connected to an inboard shear bearing; and
    an inboard beam connected to the grip and connected to the inboard shear bearing.

6. The folding rotor blade assembly of claim 1, further comprising a pair of axially aligned blade fold bolts at the pivotal connection providing a pivot axis of the rotor blade relative to the grip.

7. The folding rotor blade assembly of claim 1, wherein the rotor blade is connected to the grip at a releasable connection with axially aligned releasable pins.

8. The folding rotor blade assembly of claim 7, wherein upon engagement of the releasable pins with the rotor blade and the grip, the rotor blade is locked with respect to the grip in an unfolded position.

9. The folding rotor blade assembly of claim 7, wherein upon release of the releasable pins from engagement with the rotor blade and the grip, the rotor blade may be rotated around the pivotal connection to a folded position.

10. The folding rotor blade assembly of claim 1, wherein the rotor blade further comprises a first blade tang and a second blade tang connected to interior surfaces of the grip at the pivotal connection.

11. A folding rotor blade assembly, comprising:
    a yoke connected to a hub spring assembly;
    an inboard clamp mounted to the yoke proximate the hub spring assembly and connected to an inboard shear bearing;
    an inboard beam, housing the inboard shear bearing, connected to a grip;
    a spindle connected to the yoke and connected to an outboard centrifugal force ("CF") bearing;
    an outboard beam, housing the outboard CF bearing, connected to a rotor blade; and
    the rotor blade connected to the grip at a pivotal connection positioned inboard of the outboard CF bearing.

12. The folding rotor blade assembly of claim 11, further comprising a pair of axially aligned blade fold bolts at the pivotal connection providing a pivot axis of the rotor blade relative to the grip.

13. The folding rotor blade assembly of claim 12, wherein the rotor blade is connected to the grip at a releasable connection with axially aligned releasable pins.

14. The folding rotor blade assembly of claim 13, wherein upon engagement of the releasable pins with the rotor blade and the grip, the rotor blade is locked with respect to the grip in an unfolded position.

15. The folding rotor blade assembly of claim 13, wherein upon release of the releasable pins from engagement with the rotor blade and the grip, the rotor blade may be rotated around the pivotal connection to a folded position.

16. The folding rotor blade assembly of claim 13, wherein the rotor blade further comprises a first blade tang and a second blade tang connected to interior surfaces of the grip at the pivotal connection.

17. A method comprising:
    pitching a rotor blade of a rotor blade assembly comprising an inboard bearing connected to a yoke and a grip, an outboard bearing connected to the yoke and the rotor blade, the rotor blade connected to the grip at a lockable connection with releasable pins and at a pivotable connection with axially aligned blade bolts providing a pivot axis inboard of the outboard bearing;
    releasing the releasable pins at the lockable connection; and
    rotating the rotor blade about the pivot axis.

18. The method of claim 17, wherein the outboard bearing further comprises an outboard centrifugal force bearing and a shear bearing.

19. The method of claim 18, wherein the rotor blade assembly is connected to a nacelle pivotally mounted to a wing.

20. The method of claim 19, wherein the rotor blade assembly is mounted to a wing and the wing is mounted to a fuselage.

\* \* \* \* \*